United States Patent
Hironaka et al.

(10) Patent No.: US 11,001,453 B2
(45) Date of Patent: May 11, 2021

(54) ARTICLE TRANSPORT DEVICE

(71) Applicant: OSAKA SEALING PRINTING CO., LTD., Osaka (JP)

(72) Inventors: Ryo Hironaka, Sakai (JP); Tetsuya Kishimoto, Osaka (JP); Kenichi Shibao, Osaka (JP)

(73) Assignee: OSAKA SEALING PRINTING CO., LTD., Osaka (JP)

( * ) Notice: Subject to any disclaimer, the term of this patent is extended or adjusted under 35 U.S.C. 154(b) by 0 days.

(21) Appl. No.: 16/955,744

(22) PCT Filed: Dec. 21, 2017

(86) PCT No.: PCT/JP2017/045985
§ 371 (c)(1),
(2) Date: Jun. 18, 2020

(87) PCT Pub. No.: WO2019/123616
PCT Pub. Date: Jun. 27, 2019

(65) Prior Publication Data
US 2021/0009361 A1   Jan. 14, 2021

(51) Int. Cl.
*B65G 47/29* (2006.01)
*B65B 35/24* (2006.01)
(Continued)

(52) U.S. Cl.
CPC .............. *B65G 47/29* (2013.01); *B65B 35/24* (2013.01); *B65B 57/14* (2013.01); *B65G 15/30* (2013.01);
(Continued)

(58) Field of Classification Search
CPC ...... B65G 47/28; B65G 47/29; B65G 47/295; B65G 47/8861; B65G 47/8876;
(Continued)

(56) References Cited

U.S. PATENT DOCUMENTS 3,335,841 A * 8/1967 Klingel .................. B65B 35/24
198/460.1
4,261,456 A * 4/1981 Scarpa ................. B65G 47/846
198/459.7
(Continued)

FOREIGN PATENT DOCUMENTS

CN   200988689 Y   12/2007
JP   S56-76625 U   6/1981
(Continued)

*Primary Examiner* — Joseph A Dillon, Jr.
(74) *Attorney, Agent, or Firm* — Maschoff Brennan

(57) ABSTRACT

An article transport device includes: an input section configured to input a package; an input belt conveyor configured to transport, toward a seal attaching mechanism, the package input by the input section; a passage detection sensor configured to detect that the package transported by the input belt conveyor passes by a predetermined position; a suspending pusher configured to temporarily suspend a subsequent package while a package is processed by the seal attaching mechanism; and an article stopper configured to block the subsequent package in a traveling direction and suspend the subsequent package while the package is processed by the seal attaching mechanism. An article detection sensor is disposed upstream of the passage detection sensor. When the passage detection sensor detects passage of one package, the suspending pusher is caused to operate so that a subsequent package is temporarily suspended.

6 Claims, 8 Drawing Sheets

(51) Int. Cl.
  *B65B 57/14* (2006.01)
  *B65G 15/30* (2006.01)
  *B65G 43/08* (2006.01)
  *B65G 47/88* (2006.01)

(52) U.S. Cl.
  CPC ......... *B65G 43/08* (2013.01); *B65G 47/8815* (2013.01); *B65G 2203/0233* (2013.01)

(58) Field of Classification Search
  CPC ............ B65G 47/8884; B65G 47/8892; B65G 2203/0233; B23Q 3/186; B65B 35/00; B65B 35/24; B65B 57/14
  USPC ....... 198/341.08, 345.1, 345.3, 418.8, 419.1, 198/459.6, 456.9, 460.1
  See application file for complete search history.

(56) References Cited

U.S. PATENT DOCUMENTS

| | | | | |
|---|---|---|---|---|
| 4,355,712 A * | 10/1982 | Bruno | ................... | B65G 47/31 198/459.6 |
| 4,489,533 A * | 12/1984 | Treiber | ................ | B65G 47/244 198/345.1 |
| 5,372,233 A * | 12/1994 | Fujino | ................... | B65G 43/08 198/341.09 |
| 5,924,546 A * | 7/1999 | Funaya | ................ | B65G 47/256 198/395 |
| 6,450,322 B1 * | 9/2002 | Beck | ................... | B65G 47/8884 198/463.4 |
| 6,479,984 B1 * | 11/2002 | Vesaruch | ........... | B65G 47/8884 324/757.04 |
| 6,763,930 B2 * | 7/2004 | Johnson | ............... | B65G 47/266 193/35 A |
| 9,409,724 B2 * | 8/2016 | Hammacher | ........... | B65B 23/14 |
| 2007/0089967 A1 | 4/2007 | Pryor | | |
| 2014/0137510 A1 * | 5/2014 | Lang | ....................... | B65B 57/14 53/55 |
| 2016/0229643 A1 * | 8/2016 | Peterman | ............. | B65G 47/295 |
| 2017/0057754 A1 * | 3/2017 | Astner | ................. | B65G 47/088 |
| 2018/0305138 A1 * | 10/2018 | Wittmann | ............. | B65B 59/005 |
| 2020/0047365 A1 * | 2/2020 | Hawkins | ................ | B65B 35/24 |
| 2020/0307916 A1 * | 10/2020 | Schroder | ................ | B65B 57/10 |
| 2020/0346797 A1 * | 11/2020 | Ishizuka | ................. | B65B 11/48 |

FOREIGN PATENT DOCUMENTS

| | | |
|---|---|---|
| JP | H02-088928 U | 7/1990 |
| JP | H03-98911 A | 4/1991 |
| JP | H07-297537 A | 11/1995 |
| JP | 2001-58721 A | 3/2001 |
| JP | 2015-85955 A | 5/2015 |

\* cited by examiner

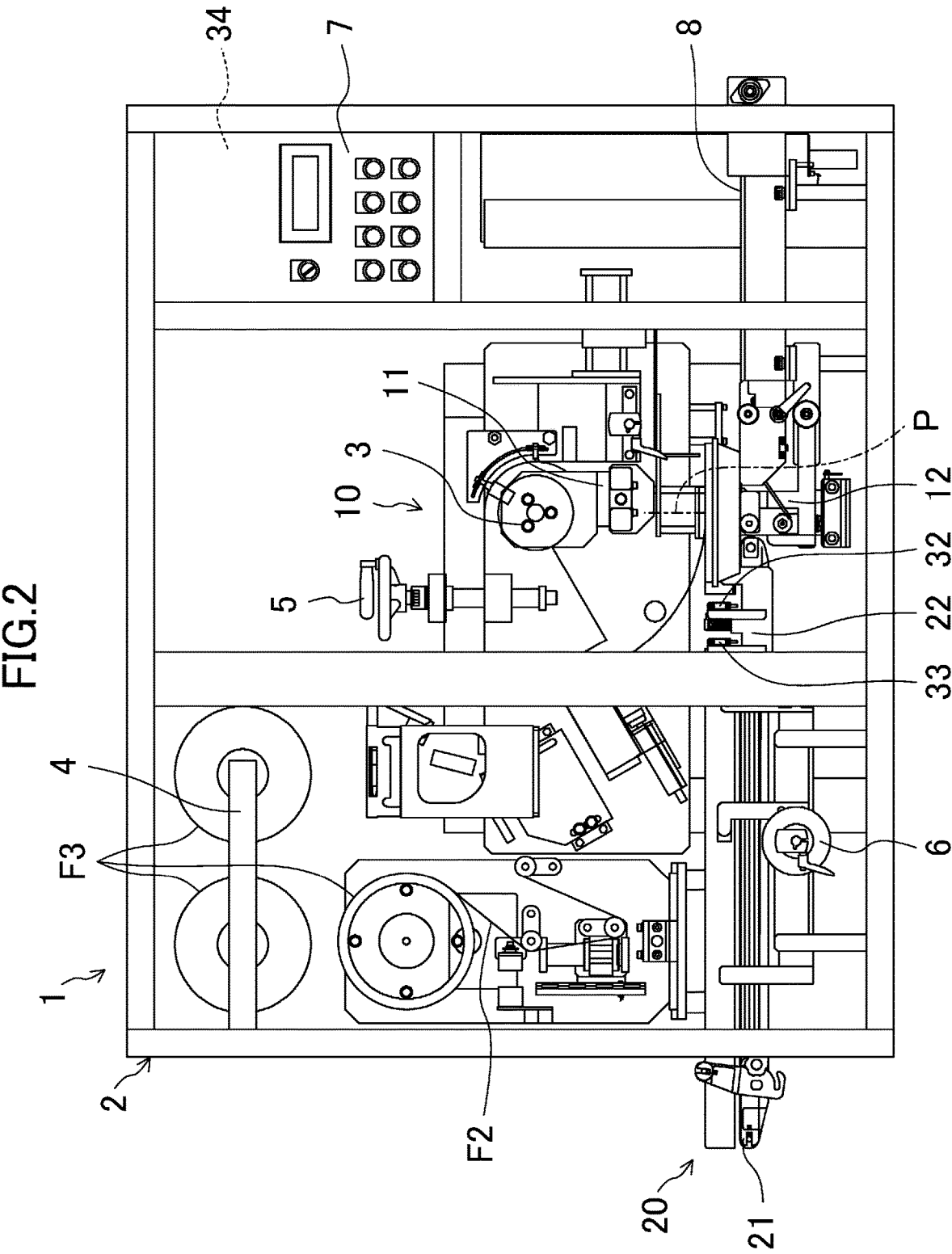

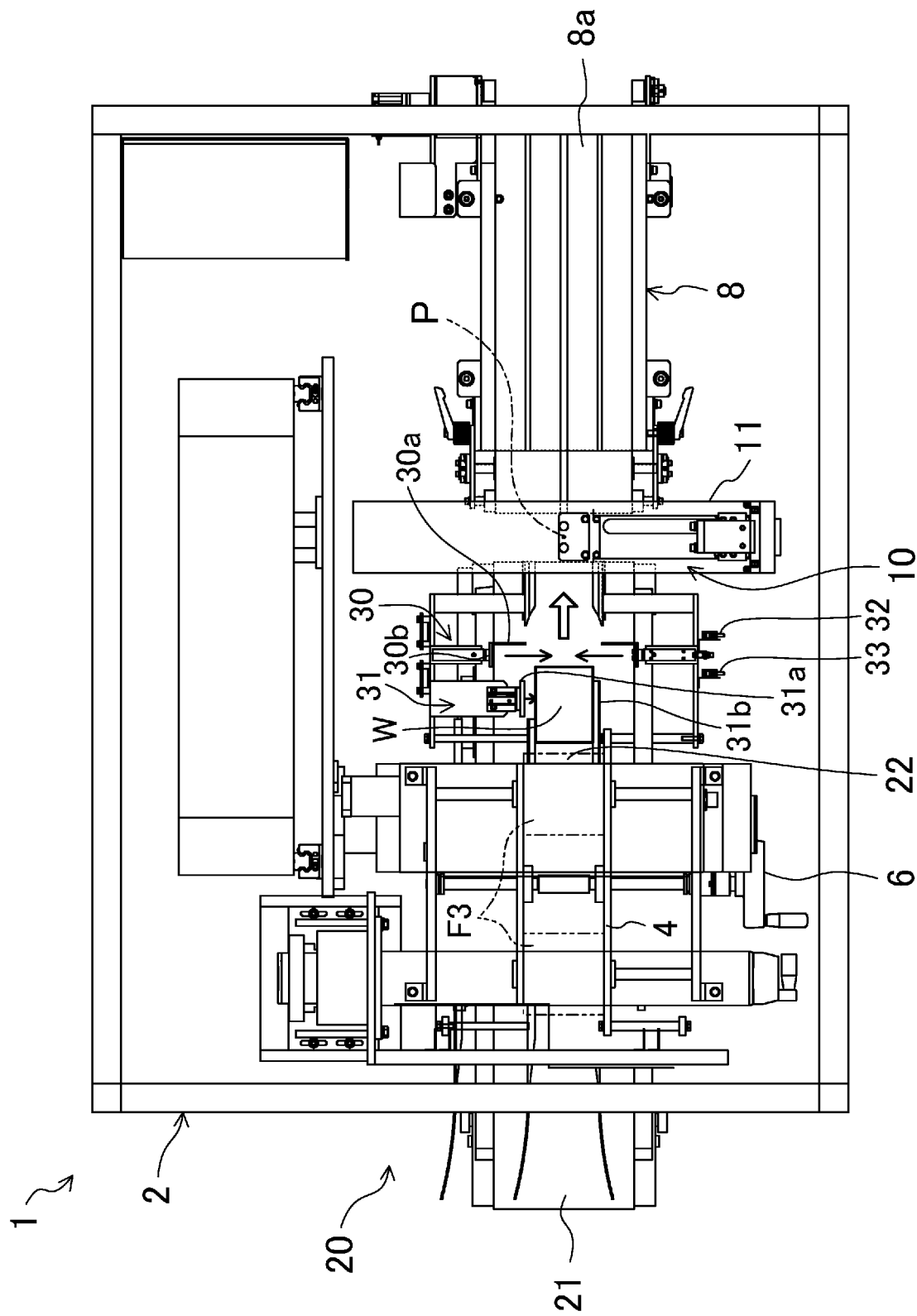

ARTICLE TRANSPORT DEVICE

TECHNICAL FIELD

The present invention relates to an article transport device disposed upstream of a processing device, such as a packaging device, and configured to transport articles, and particularly relates to a technique for transporting articles such that a sufficient transport interval is kept to a subsequent article while the processing device is performing a process.

BACKGROUND ART

In a band-wrapping packaging device known to date, an article is transported by an article transport device, and a band-shaped film piece is attached to a surface of the article (see, for example, Patent Document 1). In this band-wrapping packaging device, to attach a band-shaped film piece onto a transported article, process steps such as feeding a film piece, receiving the film piece, placing the film piece onto an article at an attachment position, and attaching the film piece onto a back surface of the article are successively performed.

CITATION LIST

Patent Document

Patent Document 1: Japanese Patent Application No. 2015-85955

SUMMARY OF THE INVENTION

Technical Problem

In the article transport device known to date, a series of processes for attaching a film piece onto an article is performed on each article, and thus, a subsequent article needs to be suspended at an attachment position for a while in order to perform processes such as appropriate attachment.

However, articles are often input at a time in an input section, and if the articles are transported at high speed from the article transport device, subsequent articles might be stagnated before the attachment position, which causes a problem.

It is therefore an object of the present invention to ensure transport of articles at regular intervals to a downstream processing device independently of the timing of inputting articles.

Solution to the Problem

To achieve the object, according to the present invention, a subsequent article is temporarily suspended before an attachment position with a simple configuration.

Specifically, a first aspect is based on an article transport device configured to transport an article toward a downstream processing device. The article transport device includes: an input section configured to input an article; an import mechanism configured to transfer, toward the processing device, the article input from the input section; a passage detection sensor configured to detect that the article transported by the import mechanism has passed by a predetermined position; an article stopper configured to block the article in a traveling direction and to suspend movement of the article; a suspending mechanism configured to temporarily suspend a subsequent article at a time when a preceding article is processed by the processing device; an article detection sensor disposed upstream of the passage detection sensor; and a controller configured to determine that subsequent articles successively move and to cause the suspending mechanism to operate and separates the subsequent articles from a preceding article in a case where after the passage detection sensor detects a front end of the preceding article, the article detection sensor still detects an article after a lapse of time in which the preceding article passes.

With this configuration, even in a case where articles are successively input to the input section, when the passage detection sensor detects passage of a preceding article, the suspending mechanism is operated so that a subsequent article is temporarily suspended and separated from the preceding article. Thus, a sufficient time can be obtained for processing the preceding article by the processing device. Not only the passage detection sensor but also the article detection sensor disposed upstream of the passage detection sensor ensures detection of successive movement of subsequent articles and also ensures separation from the preceding article.

In a second aspect, in the article transport device of the first aspect, when the passage detection sensor detects that passage of the preceding article is completed, the controller causes the article stopper to operate so that movement of the subsequent articles is suspended.

With this configuration, after completion of passage of the separated preceding article is detected, the article stopper blocks movement of a subsequent article. Thus, the subsequent article can be reliably suspended.

In a third aspect, in the article transport device of the second aspect, the article stopper includes an extendable cylinder rod and a thin plate attached to a front end of the cylinder rod, and the article stopper is disposed between the passage detection sensor and the article detection sensor.

With this configuration, since the thin plate is thin, the thin plate can be easily inserted between the separated preceding article and the subsequent article so that movement of the subsequent article can be reliably blocked.

In a fourth aspect, in the article transport device of any one of the first through third aspects, the suspending mechanism is configured to push a side of a subsequent article and temporarily suspend the subsequent article while the preceding article is processed by the processing device.

With this configuration, since the side of the article is pushed, an error in the timing of pushing is allowed to some degree, unlike a configuration in which movement of an article is blocked.

In a fifth aspect, in the article transport device of any one of the first through third aspects, the import mechanism includes a downstream belt conveyor disposed downstream of the article stopper and an upstream conveyor disposed upstream of the article stopper, and the suspending mechanism is configured to stop the upstream conveyor so that a subsequent article is temporarily suspended while the preceding article is processed by the processing device.

With this configuration, by suspending movement of the upstream conveyor, movement of the subsequent article can be directly stopped without fail.

In a sixth aspect, in the article transport device of any one of the first through fifth aspects, the import mechanism is a belt conveyor, and an upper surface of a belt to be driven has a friction coefficient with which a bottom surface of an article slips when the article stopper blocks the article in a traveling direction.

With this configuration, switching between suspension and transport of an article can be performed without damage on the article.

Advantages of the Invention

As described above, according to the present invention, when passage of a preceding article and the presence of a subsequent article are detected by using the passage detection sensor and the article detection sensor, the suspending mechanism is operated to temporarily suspend the subsequent article. Thus, articles can be reliably transported at appropriate intervals toward the downstream processing device, independently of the input timing of articles.

BRIEF DESCRIPTION OF THE DRAWINGS

FIG. 2 A side view illustrating a band-wrapping packaging device.

FIG. 3 A plan view illustrating a band-wrapping packaging device.

DESCRIPTION OF EMBODIMENTS

Figure 1A:
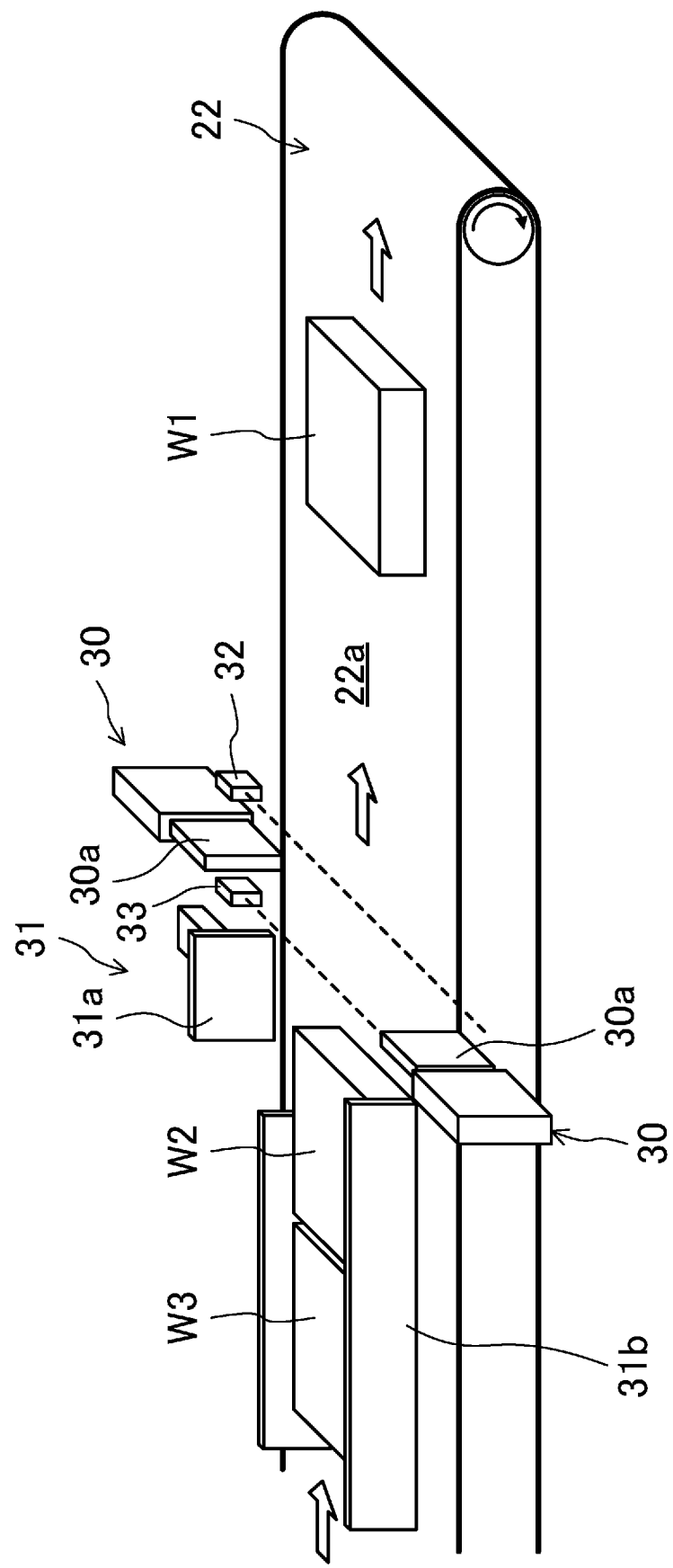
FIG. 1A A perspective view schematically illustrating an article transport device according to an embodiment of the present invention.

Embodiments of the present invention will be described hereinafter with reference to the drawings.

FIGS. 2 and 3 illustrate a band-wrapping packaging device 1 including an article transport device 20 according to an embodiment of the present invention. The band-wrapping packaging device 1 transports articles toward a seal attaching mechanism 10 serving as a processing device at a downstream side.

Although not specifically described, the band-wrapping packaging device 1 includes a packaging device main body 2 constituted by, for example, a metal frame. The packaging device main body 2 includes the article transport device 20 and the seal attaching mechanism 10, and also includes: a film piece import mechanism 3 configured to supply a film piece F1 illustrated in FIGS. 4 and 5A through 5E by carrying out a film base F2 provided with the film piece F1; a film place 4 on which a film roll F3 is placed; a unit elevation handle 5; a centering guide handle 6; an operation panel 7 including a controller 34; and an export mechanism 8 configured to transport a package W as an article to which the film piece F1 is attached. With these components, a process of continuously attaching the band-shaped film piece F1 onto the package W is allowed to be performed. The controller 34 may be provided in a portion except for the operation panel 7.

The seal attaching mechanism 10 as the processing device includes, for example, a film piece pushing mechanism 11 and a film piece attaching mechanism 12 so that a work of wrapping the band-shaped film piece F1 around the article W.

The article transport device 20 includes: an input section 21 configured to input the package W; and an input belt conveyor 22 serving as an import mechanism and configured to transport the package W (also referred to as W1, W2, or W3 as necessary) input from the input section 21 toward the seal attaching mechanism 10 as indicated by the white arrow in FIG. 3. Functions, for example, of the input belt conveyor 22 may be appropriately selected depending on the mass, size, and others of an article. In particular, the upper surface of an import belt 22a to be driven has a friction coefficient with which the bottom surface of the package W slips when a suspending pusher 31 described later pushes a side of the package W. The import belt 22a is not limited to a specific material. By selecting the import belt 22a that causes a slip of the package W, the input belt conveyor 22 allows the package W to slip on the upper surface of the import belt 22a while the input belt conveyor 22 is kept driven.

Figure 1B:
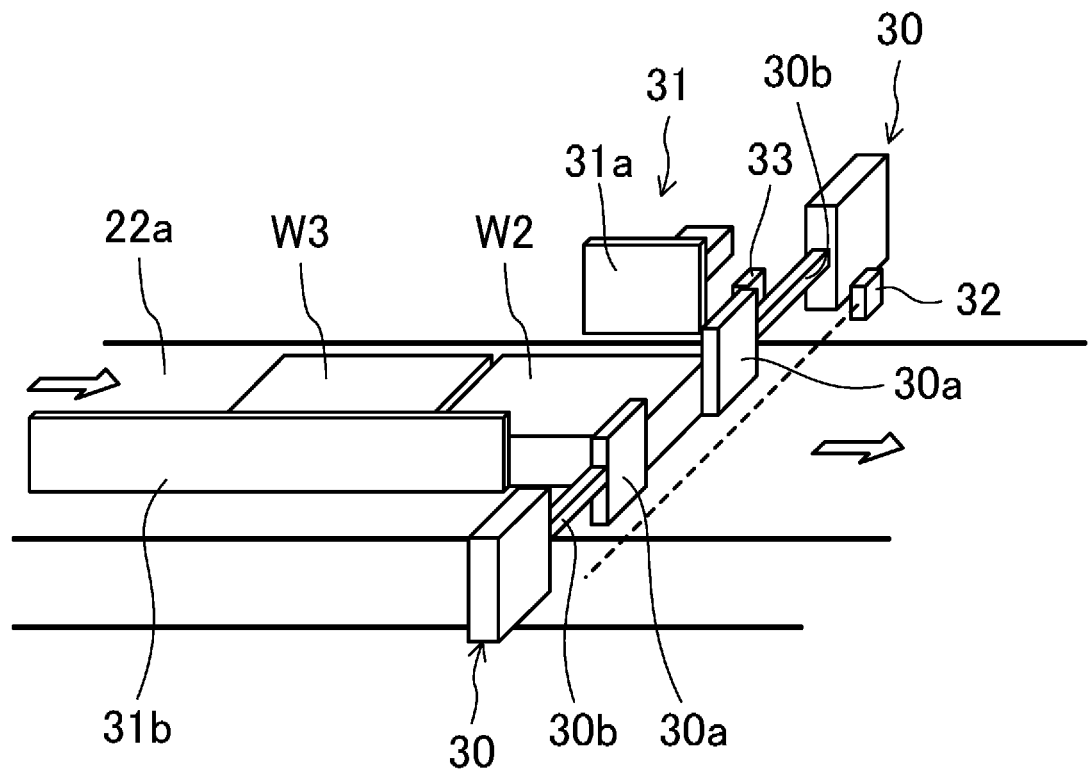
FIG. 1B A view illustrating an article suspended state and corresponding to FIG. 1A.

As illustrated in FIGS. 1B and 3, at the sides of the input belt conveyor 22, article stoppers 30 are provided to block and stop the package W transported by the import belt 22a in a traveling direction. The article stoppers 30 include, for example, extendable cylinder rods 30b and thin plates 30a attached to the front ends of the cylinder rods 30b. The thin plates 30a can be inserted to the front side of the package W (at the right side in FIG. 1A) to stop movement of the package W without damage by pushing the side surfaces of the package W. Although the thin plates 30a are shown as thick plates in FIGS. 1A through 1E, the thin plates 30a are actually made of stainless steel sheets each having a thickness of about 2 to 3 mm as illustrated in FIG. 3.

The article transport device 20 also includes a suspending pusher 31 serving as a suspending pusher 31 configured to temporarily suspend a subsequent package W at the time when the package W is processed by the seal attaching mechanism 10. The suspending pusher 31 includes: a plate-shaped pusher portion 31a to which rubber is bonded and which is configured to push a side surface of the package W; a pusher rod portion (not shown); and an article guide 31b that is disposed at the opposite side of the pusher portion 31a, guides the package W, and sandwiches the package W between the article guide 31b and the pusher portion 31a.

The article transport device 20 includes a passage detection sensor 32 disposed at a side of the input belt conveyor 22 and configured to detect that the package W transported by the import belt 22a passes by a predetermined position. The article transport device 20 also includes an article detection sensor 33 at an upstream side of the passage detection sensor 32 (at the left in FIGS. 2 and 3). The article stoppers 30 are disposed between the passage detection sensor 32 and the article detection sensor 33. The passage detection sensor 32 and the article detection sensor 33 are shown at the back side for simplicity in FIGS. 1A through 1E, but may be disposed at the front side. For example, a transmissive passage detection sensor 32 including a transmitter and a photo receiver and an article detection sensor 33 may be disposed at the front side with mirrors disposed at corresponding back sides. The passage detection sensor 32 and the article detection sensor 33 may be reflection type sensors that directly receive reflected light from an article.

Figure 1C:
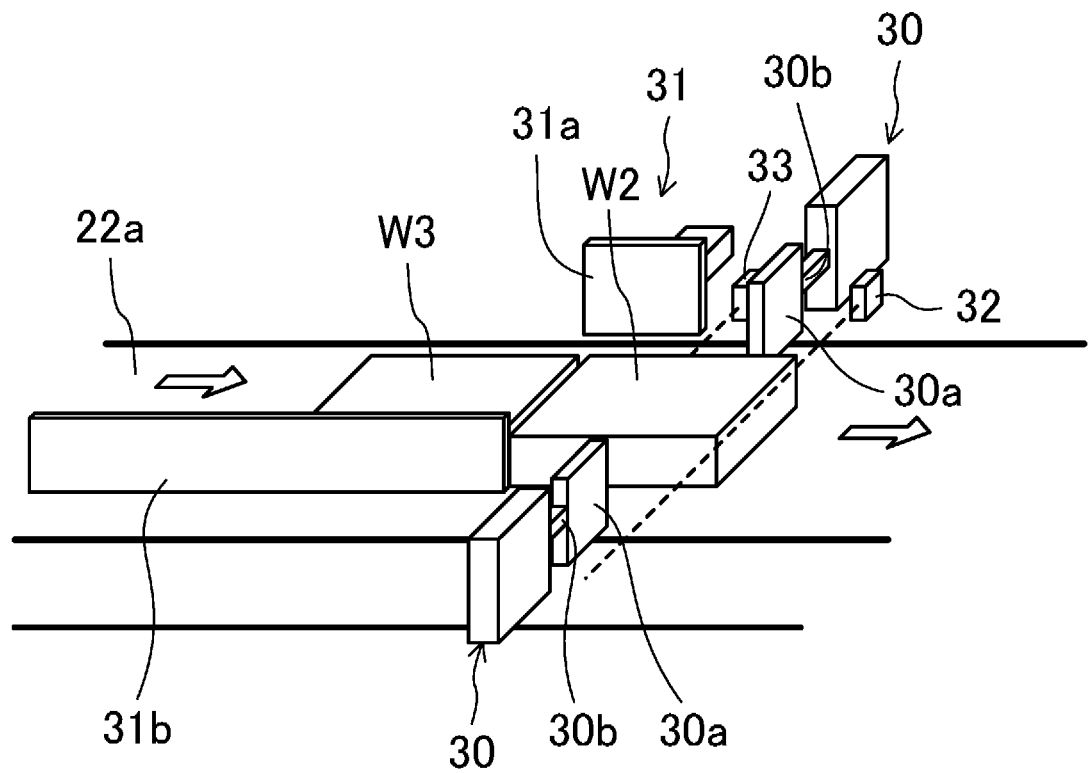
FIG. 1C A view illustrating an article import start state and corresponding to FIG. 1A.

The article transport device 20 includes controller 34 that, when the passage detection sensor 32 detects passage of a preceding package W2, causes the suspending pusher 31 to operate so that a subsequent package W3 is temporarily suspended and separated from the preceding package W2. Although specifically described later, the controller 34 is configured such that while packages W1, W2, and W3 are being transported as illustrated in FIG. 1A, after the passage detection sensor 32 detects the front end of the package W2 as illustrated in FIG. 1C, if the article detection sensor 33 still detects the package W3 after a lapse of a time in which the package W2 passes by the front of the passage detection sensor 32 as illustrated in FIG. 1E, the controller 34 determines that the subsequent package W3 approaches, and the controller 34 causes the suspending pusher 31 to operate so that the subsequent package W3 is temporarily suspended.

—Operation of Article Transport Device—

An operation of the article transport device 20 according to this embodiment will now be described with reference to FIGS. 1B through 1F.

First, as illustrated in FIG. 1B, in an article suspension state, the cylinder rods 30b of the article stoppers 30 are extended so that the front side of the package W2 in the traveling direction is blocked by the thin plates 30a and is temporarily suspended together with the subsequent package W3 with the import belt 22a kept driven.

Next, at the time when or before the process of attaching a film piece F1 onto the package W1 by the seal attaching mechanism 10 is finished, the cylinder rods 30b are reduced in size and the thin plates 30a are retracted so that the packages W2 and W3 move forward, as illustrated in FIG. 1C.

Figure 1D:
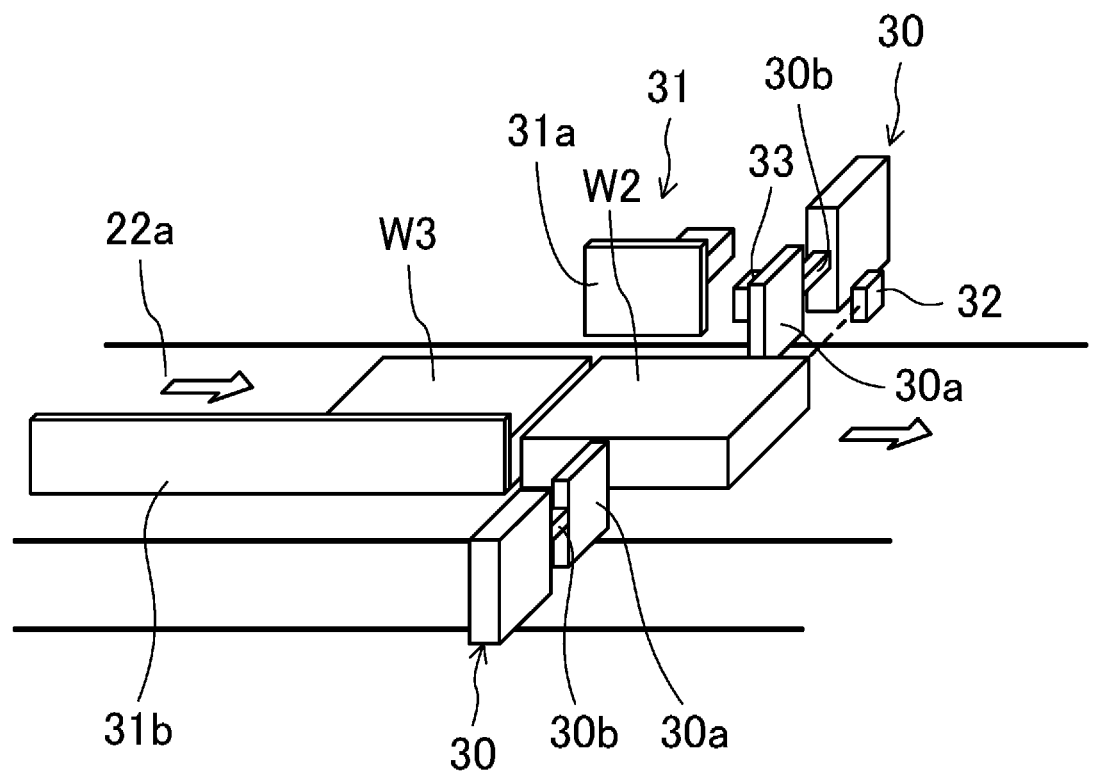
FIG. 1D A view illustrating an article import detection state and corresponding to FIG. 1A.
Figure 1E:
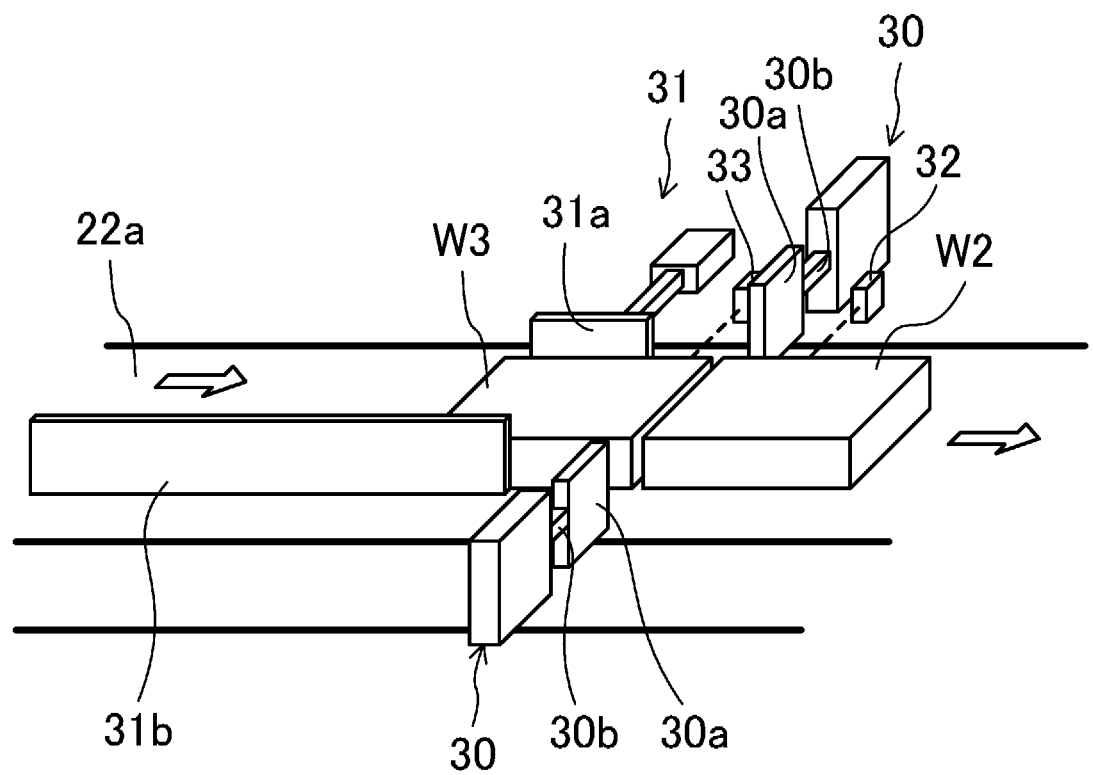
FIG. 1E A view illustrating a suspending pusher operating state and corresponding to FIG. 1A.

Thereafter, as illustrated in FIG. 1D, when the front end of the package W2 passes by the passage detection sensor 32, the passage detection sensor 32 detects the passage. At this time, an article passage timer T starts counting up.

Here, an expected passage time T1 when one package W passes by the passage detection sensor 32 is calculated from a predetermined length of the package W and a transport speed of the import belt 22a. Then, as illustrated in FIG. 1E, it is determined whether the time counted by the passage timer T exceeds the expected passage time T1 while the preceding package W2 passes by the passage detection sensor 32.

When the time counted by the passage timer T exceeds the expected passage time T1 (T≥T1), if the article detection sensor 33 still detects the presence of the package W3, it is determined that the package W3 is present immediately after the preceding package W2, and the pusher rod portion of the suspending pusher 31 is extended in order to temporarily suspend the subsequent package W3. Accordingly, the package W3 is sandwiched between the pusher portion 31a and the article guide 31b, and slips on the upper surface of the import belt 22a to be thereby stopped. Then, the preceding package W2 and the subsequent package W3 are separated from each other. At this time, since the pusher portion 31a pushes a side of the package W3, unlike a configuration in which movement of the package W3 is blocked, an error in the pushing timing is allowed to some degree. In the meantime, the processed package W1 is transported by the export mechanism 8 and the preceding package W2 reaches the seal attaching mechanism 10, and then, the process of attaching the film piece F1 is sequentially performed.

Figure 1F:
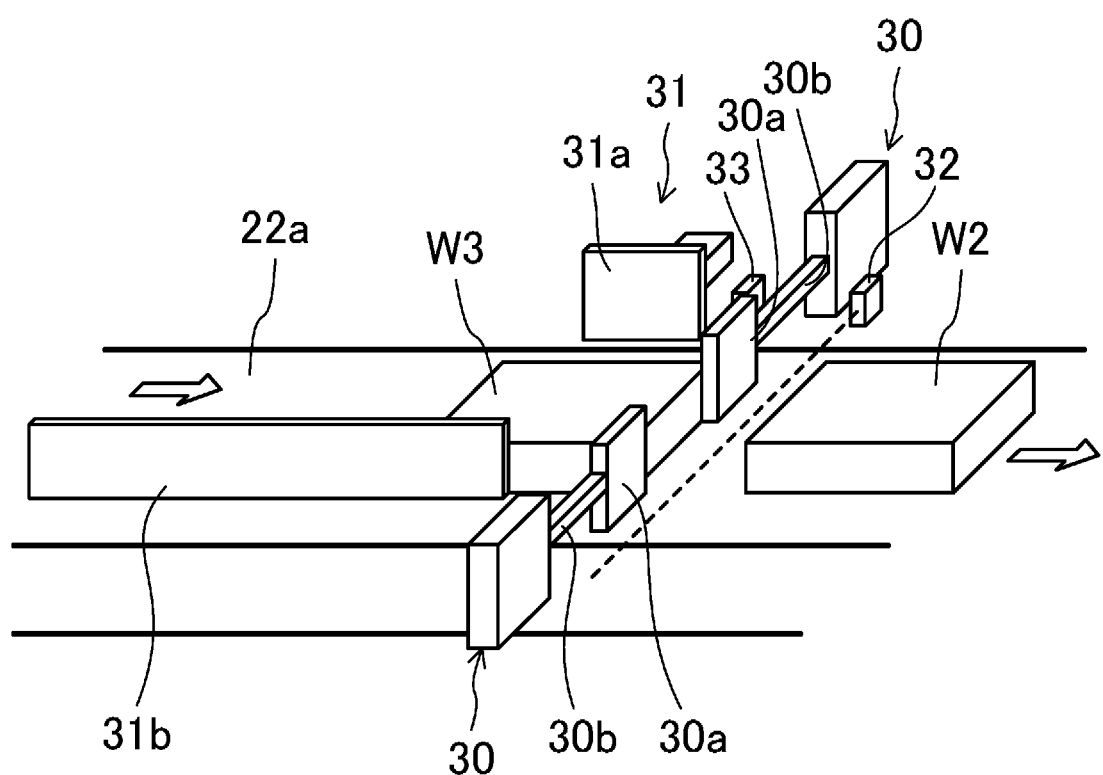
FIG. 1F A view illustrating a state where separation of a subsequent article is completed and corresponding to FIG. 1A.

Thereafter, as illustrated in FIG. 1F, when the package W2 has completely passed by the passage detection sensor 32, the article stoppers 30 are operated and the thin plates 30a block the front side of the package W3 in the traveling direction so that the subsequent package W3 slips on the import belt 22a to be stopped.

The series of operations described above is repeatedly performed for each article.

—Process Steps by Seal Attaching Mechanism—

Process steps by the seal attaching mechanism 10 will now be described with reference to FIGS. 5A through 5E.

First, when the passage detection sensor 32, for example, detects that a package W is imported by the import belt 22a of the article transport device 20, one film piece F1 is sent and the film piece import mechanism 3 is started so that portions near the ends of the film piece F1 are held by a chuck mechanism.

Next, when reception of the film piece F1 is completed and the package W reaches a predetermined position, the chuck mechanism moves to a film piece supply position, and the holding of the film piece by the chuck mechanism is canceled. At this time, a portion at the front end of the package W is sandwiched by an upper transport belt 13, and the film piece F1 is supplied to be placed near a center of the package W in the front-rear direction, and immediately, is sandwiched and transported together with the package W while being pushed by the upper transport belt 13 from above.

Thereafter, the package W on which the film piece F1 is placed and which is being transported while being sandwiched between the upper transport belt 13 and the import belt 22a located below the upper transport belt 13 reaches the start end (i.e., left end in FIG. 3) of an export belt 8a of the export mechanism 8 across the front end of the import belt 22a in the import direction, and is further transported by the import belt 22a, the export belt 8a, and the upper transport belt 13 sequentially.

Subsequently, when an optical sensor, for example, detects that the center of the package W in the front-rear direction reaches a packaging position P, the export belt 8a and the upper transport belt 13 are suspended so that movement of the package W is stopped. At this time, the import belt 22a continues operating for transporting subsequent articles, and the import belt 22a continues operating while slipping on the transport surface with respect to the package W fixed and sandwiched between the suspended export belt 8a and upper transport belt 13.

Figure 5A:
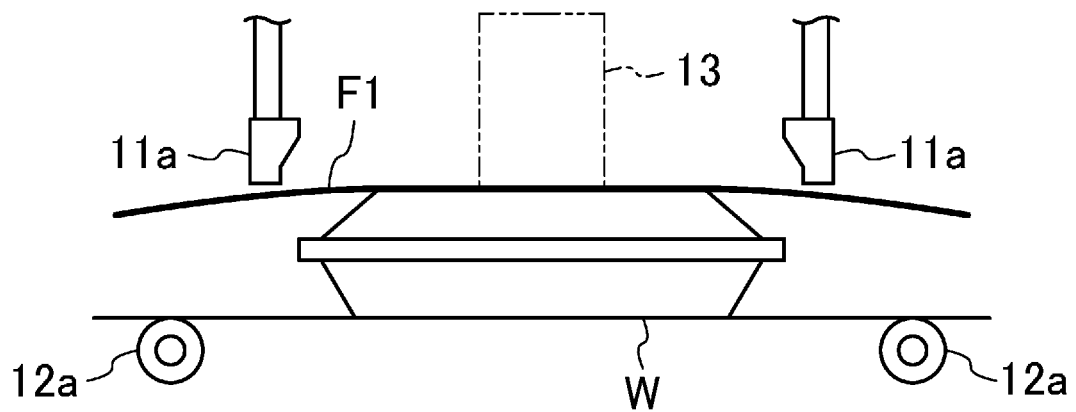
FIG. 5A A schematic front view illustrating a step of a seal attachment process.
Figure 5B:
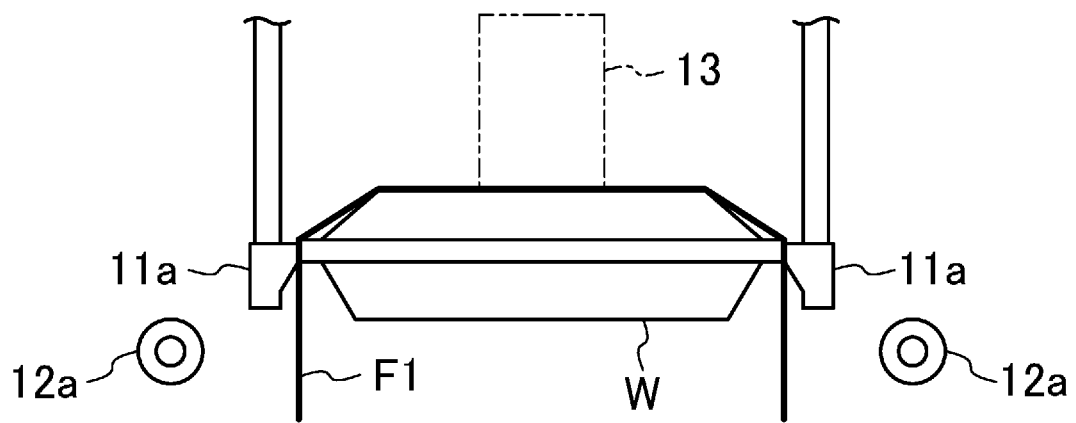
FIG. 5B A schematic front view illustrating another step of the seal attachment process.

Then, as illustrated in FIGS. 5A and 5B, based on detection that the package W has reached the packaging position P, the film piece pushing mechanism 11 is first started, left and right pushing members 11a at an upper standby position are lowered, side portions of the film piece F1 extending laterally outward from the package W are pushed downward along lateral sides of the package W.

Figure 5C:
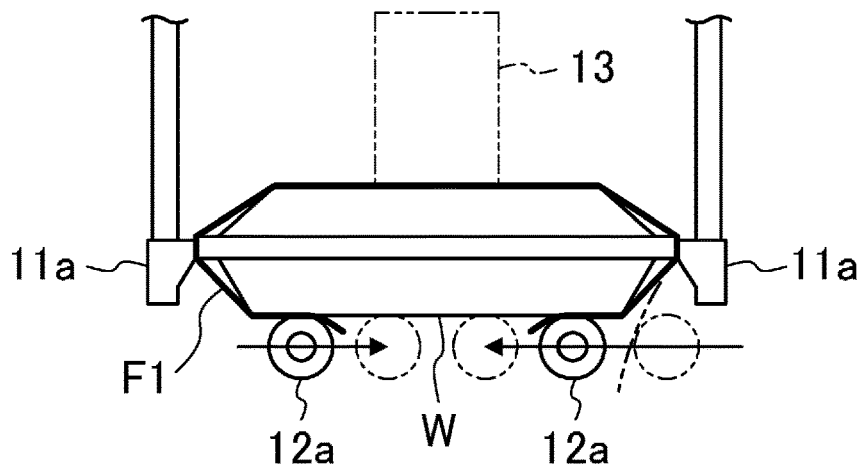
FIG. 5C A schematic front view illustrating yet another step of the seal attachment process.
Figure 5D:
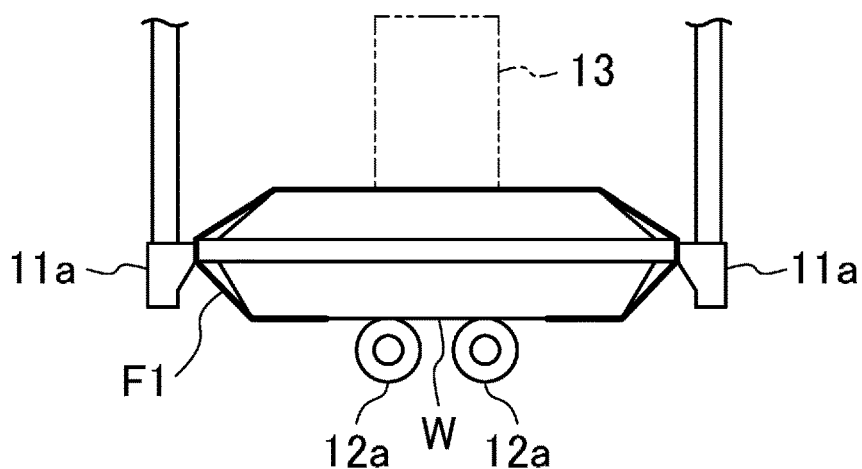
FIG. 5D A schematic front view illustrating still another step of the seal attachment process.

Thereafter, as illustrated in FIGS. 5C and 5D, the film piece attaching mechanism 12 is started, and left and right attaching members 12a waiting at laterally outer sides of an article transport passage move horizontally to an attachment action position under the package W. Accordingly, the film piece F1 hanging down from the package W is pushed by the attaching members 12a and wrapped up to the bottom surface of the package W, and adhesive portions of the film piece F1 at both ends thereof are elastically pushed against the bottom surface of the package W and attached thereto.

Figure 5E:
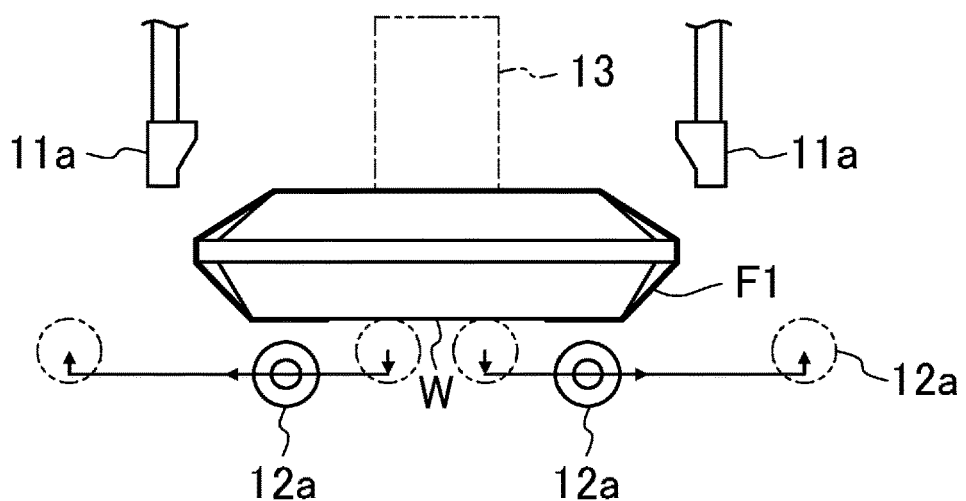
FIG. 5E A schematic front view illustrating still another step of the seal attachment process.

Subsequently, as illustrated in FIG. 5E, the attaching members 12a are slightly lowered to be separated from the bottom surface of the package W, and then, are horizontally retracted to the original standby position without touching the attached film piece F1.

Figure 4:
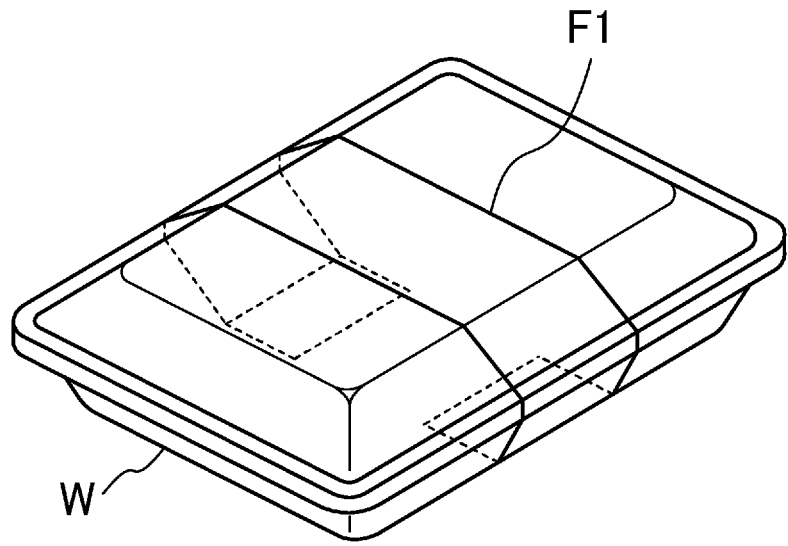
FIG. 4 A perspective view illustrating a band-wrapped package.

When wrapping attachment of the film piece F1 is completed, the export belt 8a and the upper transport belt 13 are operated again, and the package W band-wrapped by the film piece F1 as illustrated in FIG. 4 is transported in a transport direction indicated by a white arrow.

In the manner described above, one band-wrapping is completed, and the above process is repeated at each import of a new package W. This attachment process includes a plurality of steps, and thus, needs a sufficient processing time.

In this embodiment, however, even in the case of successively inputting packages W to the input section 21, when the passage detection sensor 32 detects passage of the preceding package W2, the suspending pusher 31 is operated so that a subsequent package W3 is temporarily suspended to be separated from a preceding package W2. Thus, a sufficient time can be reliably obtained for processing on the preceding package W2 by the seal attaching mechanism 10.

Not only the passage detection sensor 32 but also the article detection sensor 33 disposed upstream of the passage detection sensor 32 ensures detection of continuous passage of the subsequent package W3, and also ensures separation of the subsequent package W3 from the preceding package W2. Thus, no problem arises even in a case where a processing time is needed at a downstream side.

In addition, after passage of the separated preceding package W2 has been detected, the article stoppers 30 block movement of the subsequent package W3 so that the subsequent package W3 can be stopped without fail.

Moreover, the upper surface of the import belt 22a to be driven has a friction coefficient with which the bottom surface of the package W slips when the suspending pusher 31 pushes a side of the package W. Thus, switching between temporary suspension and transport of the package W can be performed without damage on the package W.

Accordingly, the article transport device 20 according to this embodiment ensures transport of packages W to the downstream seal attaching mechanism 10 at appropriate intervals, independently of the input timings of the packages W. As a result, stagnation of the package W and inappropriate attachment can be avoided.

Other Embodiments

The embodiment of the present invention may have the following configuration.

That is, in the embodiment, the suspending mechanism is constituted by the suspending pusher 31 that directly pushes a side of the subsequent package W. Alternatively, a downstream belt conveyor disposed downstream of the article stoppers 30 and an upstream conveyor disposed upstream of the article stoppers 30 may be provided as the input belt conveyor 22 so that only the upstream conveyor is stopped and a subsequent package W is temporarily suspended while the preceding package W is processed by the seal attaching mechanism 10. As described above, a configuration capable of instantaneously stopping movement of the upstream conveyor ensures direct suspension of movement of the subsequent package W.

In the embodiment described above, the processing device is the seal attaching mechanism 10 configured to attach the film piece F1 to the package W, but is not limited to this example. The article is not limited to the package W, and the processing device is not limited to the seal attaching mechanism 10. That is, the present invention is applicable to any article transport device disposed upstream of a processing device that needs to suspend a subsequent article for a while in order to perform processing on an article.

The foregoing embodiments are merely preferred examples in nature, and are not intended to limit the invention, applications, and use of the application.

DESCRIPTION OF REFERENCE CHARACTERS 1 packaging device
2 packaging device main body
3 film piece import mechanism
4 film place
5 unit elevation handle
6 centering guide handle
7 operation panel
8 export mechanism
8a export belt
10 seal attaching mechanism (processing device)
11 film piece pushing mechanism
11a pushing member
12 film piece attaching mechanism
12a attaching member
13 upper transport belt
20 article transport device
21 input section
22 input belt conveyor (import mechanism)
22a import belt
30 article stopper
30a thin plate
30b cylinder rod
31 suspending pusher (suspending mechanism)
31a pusher portion
31b article guide
32 passage detection sensor
33 article detection sensor
34 controller
F1 film piece
F2 film base
F3 film roll
W1, W2, W3 package

The invention claimed is:

1. An article transport device configured to transport an article toward a downstream processing device, the article transport device comprising:
   an input section configured to input an article;
   an import mechanism configured to import, toward the processing device, the article input from the input section;
   a passage detection sensor configured to detect that the article imported by the import mechanism has passed by a predetermined position;
   an article stopper configured to block the article in a traveling direction and to suspend movement of the article;
   a suspending mechanism configured to temporarily suspend a subsequent article at a time when a preceding article is processed by the processing device;
   an article detection sensor disposed upstream of the passage detection sensor; and
   a controller configured to determine that subsequent articles successively move and to cause the suspending mechanism to operate and separate the subsequent articles from a preceding article in a case where after the passage detection sensor detects a front end of the preceding article, the article detection sensor still detects an article after a lapse of time in which the preceding article passes.

2. The article transport device according to claim 1, wherein when the passage detection sensor detects that passage of the preceding article is completed, the controller causes the article stopper to operate so that movement of the subsequent articles is suspended.

3. The article transport device according to claim 2, wherein the article stopper includes an extendable cylinder rod and a thin plate attached to a front end of the cylinder rod, and the article stopper is disposed between the passage detection sensor and the article detection sensor.

4. The article transport device according to claim 1, wherein the suspending mechanism is configured to push a side of a subsequent article and temporarily suspend the subsequent article while the preceding article is processed by the processing device.

5. The article transport device according to claim 1, wherein the import mechanism includes a downstream belt conveyor disposed downstream of the article stopper and an upstream conveyor disposed upstream of the article stopper, and the suspending mechanism is configured to stop the upstream conveyor so that a subsequent article is temporarily suspended while the preceding article is processed by the processing device.

6. The article transport device according to claim 1, wherein the import mechanism is a belt conveyor, and an upper surface of a belt to be driven has a friction coefficient with which a bottom surface of an article slips when the article stopper blocks the article in a traveling direction.

* * * * *